United States Patent
Sheen et al.

(10) Patent No.: US 7,214,363 B2
(45) Date of Patent: May 8, 2007

(54) METHOD FOR PREPARING COMPOSITE MICROPARTICLES

(75) Inventors: So won Sheen, Seoul (KR); Man Soo Choi, Seoul (KR)

(73) Assignee: Seoul National University Industry Foundation (KR)

(*) Notice: Subject to any disclaimer, the term of this patent is extended or adjusted under 35 U.S.C. 154(b) by 186 days.

(21) Appl. No.: 10/978,084

(22) Filed: Oct. 28, 2004

(65) Prior Publication Data

US 2006/0093544 A1  May 4, 2006

(51) Int. Cl.
*C01G 23/07* (2006.01)
*C09C 1/36* (2006.01)

(52) U.S. Cl. ............ 423/613; 106/437; 423/337; 423/618; 423/625; 423/659; 427/225

(58) Field of Classification Search ........... 423/613, 423/659; 106/437; 427/225
See application file for complete search history.

(56) References Cited

U.S. PATENT DOCUMENTS

| 5,268,337 | A | 12/1993 | Katz et al. |
| 2002/0004029 | A1* | 1/2002 | Jang et al. ............... 423/613 |
| 2003/0129153 | A1* | 7/2003 | Moerters et al. ........... 424/59 |
| 2004/0007025 | A1* | 1/2004 | Gotoh et al. .............. 65/384 |

OTHER PUBLICATIONS

Gas-phase coating of TiOz with SiOz in a continuous flow hot-wall aerosol reactor; QH Powell, et al., J. Mater, Res. vol. 12, No. 2, Feb. 1997, pp. 552-559.

* cited by examiner

*Primary Examiner*—Wayne A. Langel
*Assistant Examiner*—James Fiorito
(74) *Attorney, Agent, or Firm*—Anderson Kill & Olick, P.C.

(57) ABSTRACT

Composite microparticles having thin coating layers can be simply prepared by bringing a host particle precursor into contact with a flame generated in a burner movably mounted at the bottom of a coating apparatus, by introducing the precursor in the form of a vapor or micronized liquid droplets upwardly into the burner, to obtain host particles; and introducing a gaseous coating precursor upwardly toward the host particles in or around the flame, the coating precursor being protected by an inert gas introduced therearound such that the formation of particles derived from the coating precursor itself is prevented.

5 Claims, 5 Drawing Sheets

METHOD FOR PREPARING COMPOSITE MICROPARTICLES

FIELD OF THE INVENTION

The present invention relates to a method for preparing composite microparticles using a flame in a gas phase coating manner.

BACKGROUND OF THE INVENTION

A particulate matter may be coated with another material to protect the surface thereof or confer specific properties thereto by various coating processes, e.g., a gas phase coating process which is advantageous in that a uniform coating layer can be obtained. A liquid phase coating process called a sol-gel process, on the other hand, requires complicated procedures and often gives an irregular coating layer.

Such a gas phase coating process has been adopted in the formation of composite microparticles. For example, U.S. Pat. No. 5,268,337 discloses a method for the formation of composite microparticles from two gaseous precursors having different reaction rates using a counterflow diffusion flame burner. However, this method is not suitable for the mass production of composite microparticles. Also, a gas phase coating method for preparing $TiO_2$—$SiO_2$ composite microparticles using a continuous flow hot-wall aerosol reactor has been reported, which comprises forming $TiO_2$ particles and coating the $TiO_2$ particles with $SiO_2$ by way of separately introducing suitable precursors thereof at different positions of a reactor (See Powell, Q. H. et al., *J. Mater Res., Vol* 12, No. 2, pp. 552–559 (1997)). However, this method is not suitable for preparing ultra-fine composite particles (nanoparticles) because it requires a long residence time of the precursors in the reactor besides the problem of the precursor deposition on the reactor wall.

SUMMARY OF THE INVENTION

Accordingly, it is an object of the present invention to provide a method for preparing composite microparticles having ultra-thin coating layers by way of continuously forming host particles and coating a thin layer on the surface of the host particles.

In accordance with one aspect of the present invention, there is provided a method for preparing composite microparticles, which comprises
(i) bringing a host particle precursor into contact with a flame by introducing the precursor in the form of a vapor or micronized liquid droplets upwardly into a burner, to obtain host particles; and
(ii) introducing a gaseous coating precursor upwardly toward the host particles in or around the flame, the coating precursor being protected by an inert gas introduced therearound such that the formation of particles derived solely from the coating precursor is prevented.

BRIEF DESCRIPTION OF THE DRAWINGS

The above and other objects and features of the present invention will become apparent from the following description of the invention, when taken in conjunction with the accompanying drawings, which respectively show:
FIG. 1a: a schematic diagram of a co-flow diffusion flame burner used in the present invention.

DETAILED DESCRIPTION OF THE INVENTION

The inventive method is characterized in that host particles formed by a flame are directly reacted with a gaseous coating precursor in situ to obtain composite microparticles having thin coating layers.

Figure 1A:
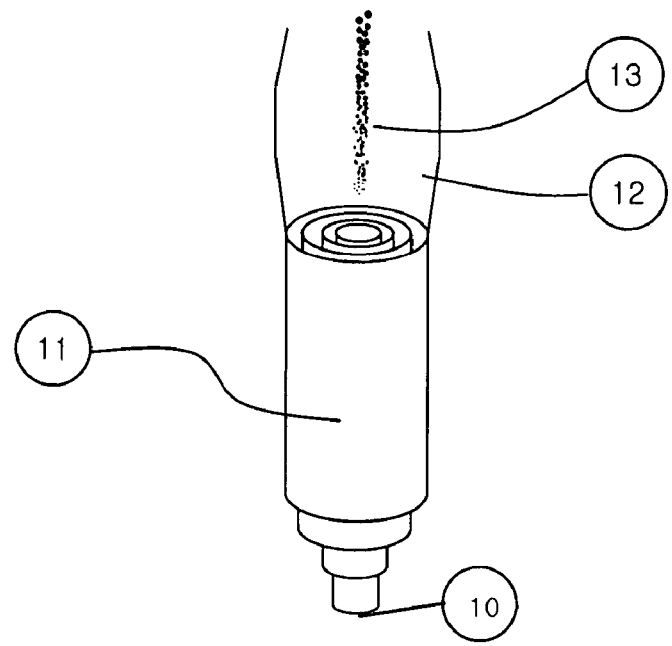
FIG. 1a: a schematic diagram of a co-flow diffusion flame burner
Figure 1B:
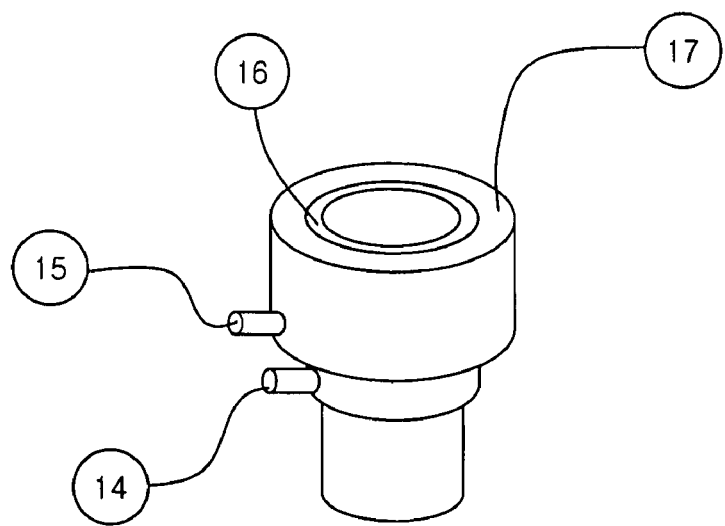
FIG. 1b: a schematic diagram of a particle coating apparatus used in the present invention.
Figure 2:
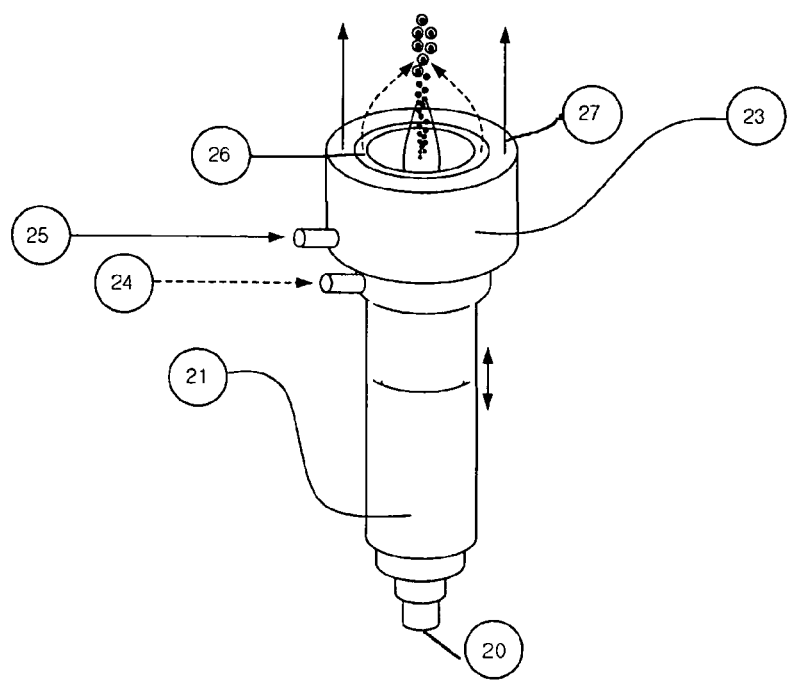
FIG. 2: a schematic view showing the process for preparing composite microparticles in accordance with the present invention.

FIG. 1a schematically illustrates a co-flow diffusion flame burner that can be used in the present invention, to which a coating apparatus of FIG. 1b may be movably installed in the vertical direction, as shown in FIG. 2.

Referring to FIG. 1a, a host particle precursor is introduced in the form of a vapor or micronized liquid droplets generated by bubbling, spraying, etc., into burner (11) through injecting nozzle (10) using a carrier gas (e.g., nitrogen). The introduced host particle precursor is brought into contact with flame (12) generated by the combustion of a fuel (e.g., hydrogen, methane, etc.) in the burner (11) to form host particles (13). The formed particles may be maintained in or around the flame (12).

In the present invention, the host particle preferably consists of an oxide component such as $SiO_2$, $TiO_2$, $SnO_2$, $Al_2O_3$, $GeO_2$, etc., and examples of the precursor for forming the host particle include $SiCl_4$, $TiCl_4$, $SnCl_4$, $AlCl_3$, $GeCl_4$, $SiH_4$, etc.

Referring to FIG. 1b, the coating apparatus which is used in the present invention includes inlet (14) of a coating precursor and inlet (15) of an inert gas which protects the coating precursor from forming particles derived therefrom. The coating precursor and the inert gas introduced through respective inlets are discharged through openings (16) and (17), respectively. The coating apparatus may be mounted on the top of the burner (11) and movably installed to the external cylinder of the burner (11) in the vertical direction such that the distance between the introduced gases and the flame may be controlled to improve coating efficiency.

FIG. 2 schematically illustrates the process for preparing composite microparticles in accordance with the present invention. Specifically, a host particle precursor is introduced into burner (21) through injecting nozzle (20) and contacted with a flame generated by the burner (21) to form host particles in or around the flame.

Meanwhile, a gaseous coating precursor is introduced into coating apparatus (23) through inlet (24) using a carrier gas (e.g., an inert gas, oxygen, etc.) and allowed to migrate upwardly toward opening (26), while an inert gas is introduced through inlet (25) and led toward opening (27) in such a way that it protects the coating precursor flow from contacting oxidative gases.

When the gaseous coating precursor migrates upwardly, it may form particles by itself or contact the host particle to form a coating layer on the surface thereof through the chemical reactions. The extent of such coating depends on various factors, e.g., the temperature, the pressure, the concentration of the precursor, etc. The formation of the coating precursor particles may be minimized by controlling the distance between coating apparatus (23) and flame (12), preferably, in the range of 50 mm or more, more preferably 80 mm or more.

Examples of the coating precursor which may be used in the present invention include those capable of reacting with the host particle in or around a flame. The coating precursor may be used alone or in combination to form single or multiple coating layers.

In accordance with the present invention, a host particle may be coated to a thickness ranging from 1 to 20 nm, preferably from 1 to 5 nm using said apparatus in a highly efficient manner.

The present invention is further described and illustrated in Examples provided below, which are, however, not intended to limit the scope of the present invention.

EXAMPLE 1

Composite microparticles were prepared using hydrogen/oxygen diffusion flame burner (21) and coating apparatus (23) which was installed at a height of 80 mm above the top of the burner, as illustrated in FIG. 2.

Hydrogen and oxygen were introduced to the burner (21) through inlet (25) at a flow rate of 1.8 and 4.0 l/min, respectively, to generate a flame in the burner (21). Then, $TiCl_4$ (a host particle precursor) was vaporized using a bubbler and a nitrogen carrier and introduced into the flame of the burner (21) through injecting nozzle (20) at a flow rate of $6.2 \times 10^{-4}$ mol/min to form $TiO_2$ particles. $SiCl_4$ vapor was introduced in a similar fashion into the coating apparatus (23) through inlet (24) at a flow rate of $4 \times 10^{-3}$ mol/min and let to opening (26). During the above operation, nitrogen (a protecting gas) was introduced to the burner (21) Through inlet (25) at a flow rate of 70 l/mm and led to opening (27) to allow the gaseous $SiCl_4$ to engage the surface of $TiO_2$ particles to form a $SiO_2$ coating layer of about 4 nm.

Figure 3:
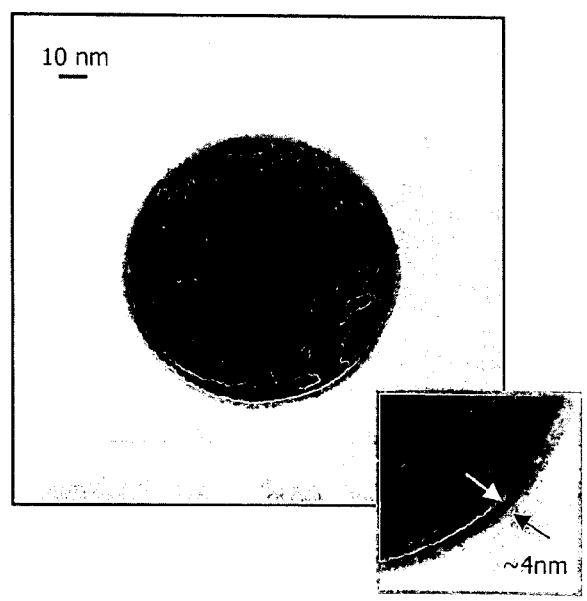
FIG. 3: a high magnitude transmission electron microscope (TEM) photograph of the composite microparticles obtained in Example 1.

TEM photographs of the $TiO_2$—$SiO_2$ composite microparticles thus obtained are shown in FIGS. 3 (high magnitude) and 4a (low magnitude), respectively.

EXAMPLE 2

The procedure of Example 1 was repeated except that the coating apparatus (23) was installed at a height of 45 mm above the top of the burner to obtain $TiO_2$—$SiO_2$ composite microparticles. TEM photograph of the composite microparticles thus obtained is shown in FIG. 4b (low magnitude).

Figure 4A:
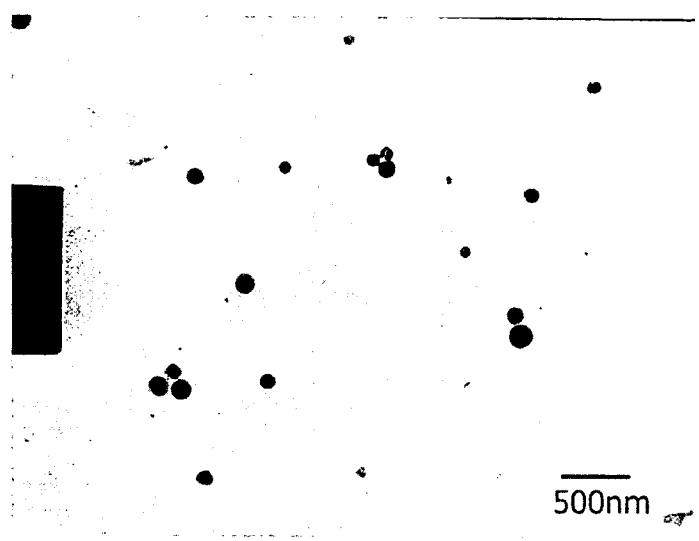
FIGS. 4a and 4b: low magnitude TEM photographs of the composite microparticles obtained in Examples 1 and 2, respectively.
Figure 4B:
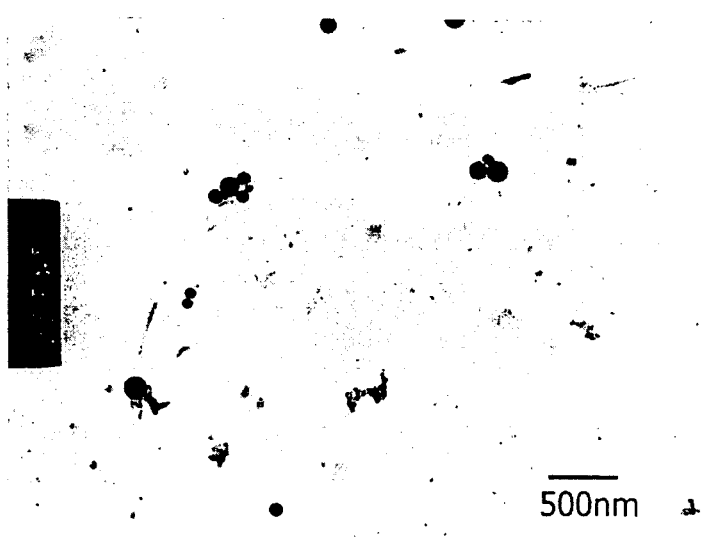

As can be seen from FIGS. 4a and 4b, when the distance between the coating apparatus and the flame is shorter (FIG. 4b) than that of Example 1 (FIG. 4a), particle agglomeration occurs to a greater extent.

EXAMPLE 3

Figure 5:
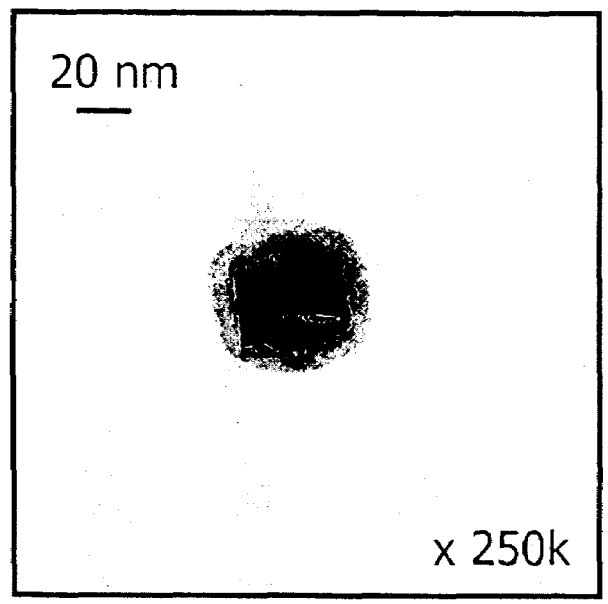
FIGS. 5 and 6: high magnitude TEM photographs of the composite microparticles obtained in Examples 3 and 4, respectively.

The procedure of Example 1 was repeated except that $SnCl_4$ was used instead of $TiCl_4$ as a host particle precursor to obtain $SnO_2$—$SiO_2$ composite microparticles. A TEM photograph of the composite microparticles thus obtained is shown in FIG. 5 (high magnitude).

EXAMPLE 4

Figure 6:
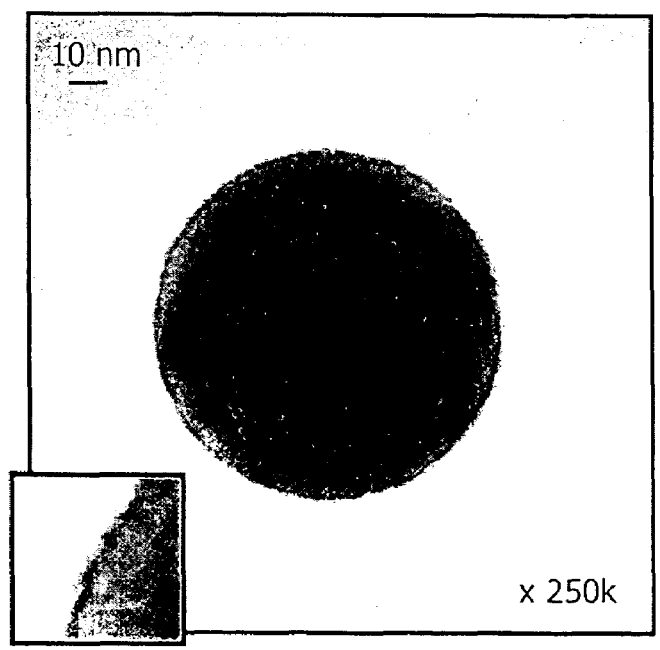
Figure 7:
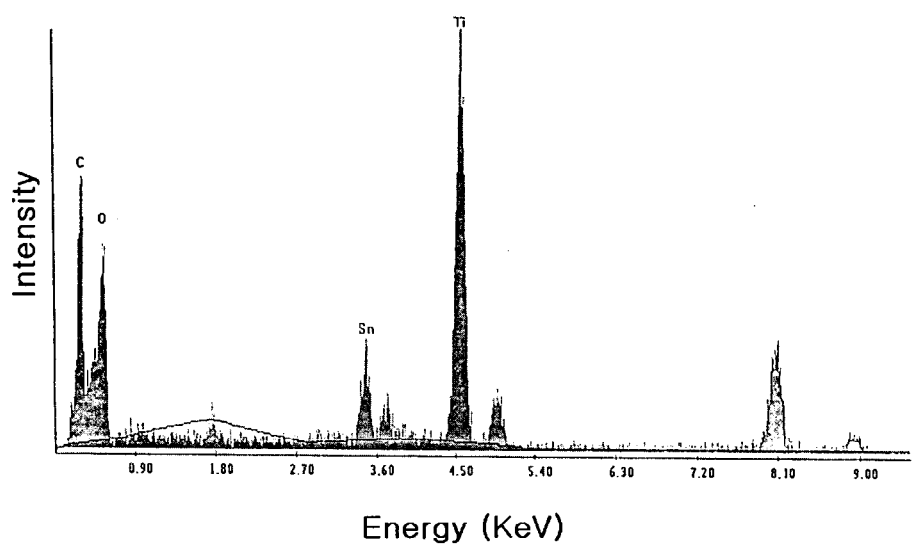
FIG. 7: Energy dispersive spectroscopy (EDS) spectra of the composite microparticles obtained in Example 4.

The procedure of Example 1 was repeated except that $SnCl_4$ was used instead of $SiCl_4$ as a gaseous coating precursor to obtain $TiO_2$—$SnO_2$ composite particles. A TEM photograph of the composite particles thus obtained is shown in FIG. 6 (high magnitude). EDS spectra of said composite particles shows the presence of a $SnO_2$ coating layer, as can be seen in FIG. 7.

EXAMPLE 5

$TiO_2$—$SiO_2$ composite microparticles obtained in Example 1 were collected at various positions above the coating apparatus (23) and subjected to zeta potential measurements. The results are shown in FIG. 8.

Figure 8:
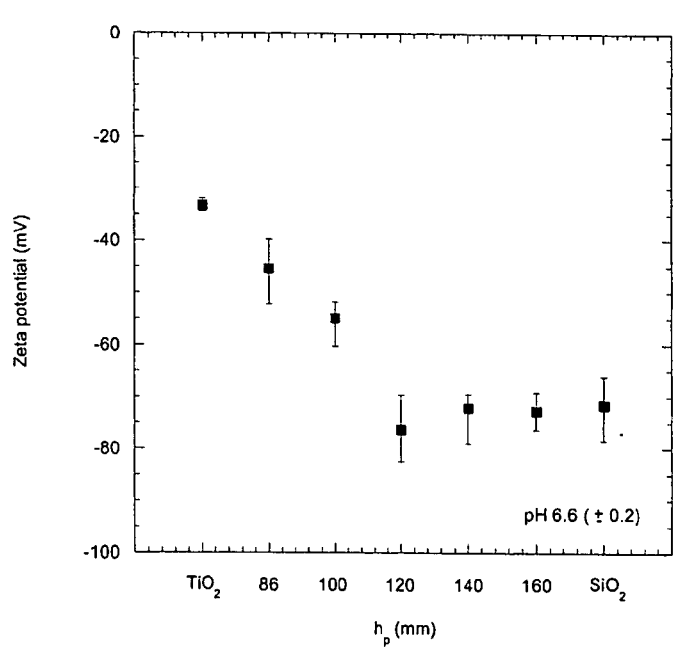
FIG. 8: the variation in the zeta potential of various fractions of the composite microparticles obtained in Example 1.

As can be seen in FIG. 8, the surface property of the composite microparticles varies in a well-definable manner between those of $TiO_2$ and $SiO_2$ with the high of the collecting position.

While the invention has been described with respect to the above specific embodiments, it should be recognized that various modifications and changes may be made to the invention by those skilled in the art which also fall within the scope of the invention as defined by the appended claims.

What is claimed is:

1. A method for preparing composite microparticles, which comprises
   (i) bringing a host particle precursor into contact with a flame by introducing the precursor in the form of a vapor or micronized liquid droplets upwardly into a burner, to obtain host particles; and
   (ii) introducing a gaseous coating precursor upwardly toward the host particles in or around the flame through one inlet of a coating apparatus, the coating precursor being protected by an inert gas introduced therearound throuoh another inlet of the coating apparatus such that the formation of particles derived solely from the coating precursor is prevented,
   wherein the flame is generated to the burner, and the coating apparatus is installed in an external cylindrical casing of the burner to permit relative sliding movement between the coating apparatus and the flame of the burner in a given direction for adjusting the distance therebetween.

2. The method of claim 1, wherein the host particle precursor or the gaseous coating precursor is introduced using a carrier gas.

3. The method of claim 1, wherein the gaseous coating precursor is a single compound or a mixture of compounds.

4. The method of claim 1, wherein the gaseous coating precursor is coated on the surface of the host particle to a thickness ranging 1 to 20 nm.

5. The method of claim 4, wherein the thickness of the coated precursor ranges from to 10 nm.

* * * * *